US011061463B2

(12) United States Patent
Ardanaz et al.

(10) Patent No.: US 11,061,463 B2
(45) Date of Patent: *Jul. 13, 2021

(54) SYSTEMS AND METHODS FOR SYNERGISTIC SOFTWARE-HARDWARE POWER BUDGET MANAGEMENT

(71) Applicant: INTEL CORPORATION, Santa Clara, CA (US)

(72) Inventors: Federico Ardanaz, Hillsboro, OR (US); Jonathan M. Eastep, Portland, OR (US); Richard J. Greco, West Linn, OR (US); Ramkumar Nagappan, Chandler, AZ (US); Alan B. Kyker, Winters, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,646

(22) Filed: Aug. 29, 2017

(65) Prior Publication Data

US 2018/0067533 A1    Mar. 8, 2018

Related U.S. Application Data

(63) Continuation of application No. 14/581,854, filed on Dec. 23, 2014, now Pat. No. 9,753,526.

(51) Int. Cl.
*G06F 1/32* (2019.01)
*G06F 1/3234* (2019.01)
*G06F 1/3287* (2019.01)
*G06F 1/3293* (2019.01)

(52) U.S. Cl.
CPC ............ *G06F 1/325* (2013.01); *G06F 1/3287* (2013.01); *G06F 1/3293* (2013.01); *Y02D 10/00* (2018.01)

(58) Field of Classification Search
CPC ...... G06F 1/325; G06F 1/3293; G06F 1/3287; Y02D 10/122; Y02D 10/171
See application file for complete search history.

(56) References Cited

U.S. PATENT DOCUMENTS

| 6,100,835 A | 8/2000 | Hamilton |
| 7,379,478 B1* | 5/2008 | Mantha ............... H04W 52/346 |
| | | 370/493 |
| 8,826,367 B2 | 9/2014 | Srivastava et al. |
| 2003/0084353 A1* | 5/2003 | Chang ...................... G06F 1/26 |
| | | 713/300 |
| 2004/0260959 A1* | 12/2004 | Tani .......................... G06F 1/26 |
| | | 713/300 |

(Continued)

OTHER PUBLICATIONS

U.S. Appl. No. 14/581,854, Non-Final Office Action, dated Aug. 25, 2016, 14 pages.

(Continued)

*Primary Examiner* — Chun Cao
(74) *Attorney, Agent, or Firm* — Green, Howard & Mughal LLP (57) ABSTRACT

Apparatus, systems, and methods provide an interface between a plurality of hardware resources of a node and a power manager. The interface is configured to define one or more resource groups to expose to the power manager for power measurement and control, assign the plurality of hardware resources to the one or more resource groups, and provide a power allowance to each resource group.

20 Claims, 3 Drawing Sheets

(56) References Cited

U.S. PATENT DOCUMENTS

| | | |
|---|---|---|
| 2006/0218423 A1 | 9/2006 | Diefenbaugh et al. |
| 2006/0294400 A1 | 12/2006 | Diefenbaugh et al. |
| 2009/0171511 A1 | 7/2009 | Tolentino |
| 2010/0299499 A1* | 11/2010 | Golla ............... G06F 9/3851 |
| | | 712/206 |
| 2011/0138195 A1 | 6/2011 | Kim et al. |
| 2012/0185706 A1* | 7/2012 | Sistla ............... G06F 1/3203 |
| | | 713/300 |
| 2013/0080796 A1 | 3/2013 | Matsubara et al. |
| 2013/0159676 A1* | 6/2013 | Muff ............. G06F 9/30101 |
| | | 712/208 |
| 2013/0318334 A1 | 11/2013 | Waskiewicz, Jr. |
| 2014/0082377 A1 | 3/2014 | Dinh et al. |
| 2014/0143558 A1 | 5/2014 | Kuesel et al. |
| 2014/0181545 A1 | 6/2014 | Shrall et al. |
| 2014/0189398 A1 | 7/2014 | Gorbatov et al. |
| 2014/0379921 A1 | 12/2014 | Morley et al. |
| 2015/0058641 A1 | 2/2015 | Parikh et al. |
| 2015/0121113 A1 | 4/2015 | Ramamurthy et al. |
| 2015/0177798 A1 | 6/2015 | Venishetti et al. |
| 2016/0147280 A1 | 5/2016 | Tessil et al. |
| 2016/0170462 A1 | 6/2016 | Ganesha et al. |

OTHER PUBLICATIONS

U.S. Appl. No. 14/581,854, Final Office Action, dated Mar. 24, 2017, 12 pages.

U.S. Appl. No. 14/581,854, Notice of Allowance, dated May 10, 2017, 5 pages.

* cited by examiner

SYSTEMS AND METHODS FOR SYNERGISTIC SOFTWARE-HARDWARE POWER BUDGET MANAGEMENT

RELATED APPLICATIONS

This application is a continuation of U.S. Non-Provisional patent application Ser. No. 14/581,854, filed Dec. 23, 2014, which is incorporated by reference herein in its entirety.

GOVERNMENT INTEREST

This invention was made with Government support under contract number H98230-11-3-0011 awarded by the Department of Deference. The Government has certain rights in this invention.

TECHNICAL FIELD

This disclosure generally relates to power management for servers and other computing devices.

BACKGROUND

Advances in semiconductor processing and logic design have permitted an increase in the amount of logic that may be present on integrated circuit devices. As a result, computer system configurations have evolved from multiple integrated circuits in a system to multiple hardware threads, multiple cores, multiple devices, and/or complete systems on an individual integrated circuit. As the density of integrated circuits has grown, the power requirements for computing systems (from embedded systems to high performance computing (HPC) systems) have also escalated.

Power and thermal management issues are considerations in designing computer-based systems. In HPC systems, for example, a specified thermal design power (TDP) and/or the cost of electricity may drive the need for low power systems. In other systems, including mobile systems, battery life and thermal limitations make these issues relevant. Optimizing a system for maximum performance at minimum power consumption is usually done using the operating system (OS) or system software to control hardware elements.

One example of an OS-based mechanism for power management is the Advanced Configuration and Platform Interface (ACPI) standard. According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. As discussed below, however, such solutions are sub-optimal in handling performance variations across collaborating threads on systems in which the objective is to have multiple threads complete a particular task (or a task phase) at the same time.

BRIEF DESCRIPTION OF THE DRAWINGS

Arrangements and embodiments may be described in detail with reference to the following drawings, in which like reference numerals refer to like elements.

DETAILED DESCRIPTION OF EMBODIMENTS

Embodiments disclosed herein are generally directed to an apparatus, method, and other techniques for managing workloads on a computer system. Certain embodiments provide an interface between a processing node or device (e.g., a central processing unit (CPU)) and a software agent or apparatus that provides power management. The interface provides flexible power management (e.g., controls and measurements). The interface allows, for example, controlling power and performance across arbitrary groups of computing threads and resources within a processing node in an efficient and scalable manner.

An application executed by a computer system may include a group of tasks that work together toward a common purpose (e.g., computing a solution to a problem). The tasks may execute on one or more nodes. Inside a node, there may be one or more tasks, and each task may include one or more processing threads. The execution time of an application or system behavior may be divided into segments that exhibit a stable or predictable operational behavior. The stable or predictable segments are referred to herein as "phases" or "task phases" of an application. Each of the phases comprises, for example, a segment of the application that exhibits operational behavior different than that of the other phases. A phase may include, for example, a compute bound phase, a memory bound phase, a communication bound phase, a mixed compute/memory/communication phase, an idle phase, an active phase, and/or another phase bound to any operational behavior.

Processing nodes with a large number of computing threads expose a challenge to software load balancing processes because performance can vary substantially due to diverse conditions across threads including, but not limited to parameters such as cache miss rate, translation lookaside buffer (TLB) miss rate, or branch misprediction rates. Manufacturing variations can also expose performance differences when operating at non-guaranteed frequency points (commonly referred as Turbo) or under thermal or power constrained conditions.

To compensate for such natural variations, certain embodiments include a hardware-software interface that enables runtime dynamic biasing of power allocation across a processing node's resources to regulate relative performance. The interface may allow allocations to be specified using a "universal coin" that enables deterministic behavior when changing allocations, as long as other conditions that might impact performance in the system such as thermals, socket power limit, and runtime application behavior remain constant.

By way of contrast with the disclosed embodiments, other solutions often increase performance overhead, do not scale for processing nodes with a large number of computing threads, and do not provide a consistent and unified way to express dynamic power and performance tradeoffs. Other solutions may enable different logical threads to express different levels of performance requirements in a processing node. As discussed above, for example, legacy APIC P-State interface enables system software to specify a concrete operating frequency request for each thread. Some specifications also comprehend the concept of abstracted performance states that can be requested by system software and internally translated by hardware into specific voltage-frequency points depending on architectural and dynamic operating conditions.

However, such solutions are sub-optimal in handling performance variations across collaborating threads on systems in which the objective is to have multiple threads complete a particular task (or a task phase) at the same time. This type of software is commonly used, for example, when decomposing large complex problems into smaller blocks of computation on scientific and enterprise applications including but not limited to traditional high performance computing (HPC) workloads.

Operating systems that are commonly used to control P-States do not comprehend user-level load balancing information. Such information may be used, for example, to understand which configuration provides optimal relative performance across computing threads at a particular point in time in order to improve or optimize the execution time for a task or a task phase. P-state interfaces expose per-thread control knobs to system software. While such approach provides flexibility, it also leads to substantial overhead as each computing thread generally needs to be interrupted in order to update the performance-level request. Moreover, the instructions used to modify such parameters are often protected and can only be executed by system code, which means that each thread undergoes a transition from user-level to system-level execution mode. Such an approach presents both a spatial and a temporal scalability problem. Certain embodiments disclosed herein, however, allow for frequent and rapid adjustment of power and/or performance bias information on systems with a large number of hardware threads.

Some server systems operate in power-constrained conditions that make "power allowance" a natural unit of management across nodes and computing threads within a node. Certain server systems, however, use disjointed mechanisms with different driving software and/or firmware components for limiting power on a particular computing node, and specify relative performance across threads like the aforementioned P-state interface. Embodiments disclosed herein, however, provide a centralized control interface that enables a single thread in a processor node, such as a single die processor socket including multiple cores, to bias power utilization across computing threads and other components within such nodes through the manipulation of a set of control registers with scalable granularity.

Various embodiments also relate to an apparatus or system for performing the operations disclosed herein. The apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the disclosed methods. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the embodiments can be practiced without these specific details. In other instances, well-known structures and devices are shown in block diagram form in order to facilitate a description thereof. The intention is to cover all modifications, equivalents, and alternatives consistent with the claimed subject matter.

Figure 1:
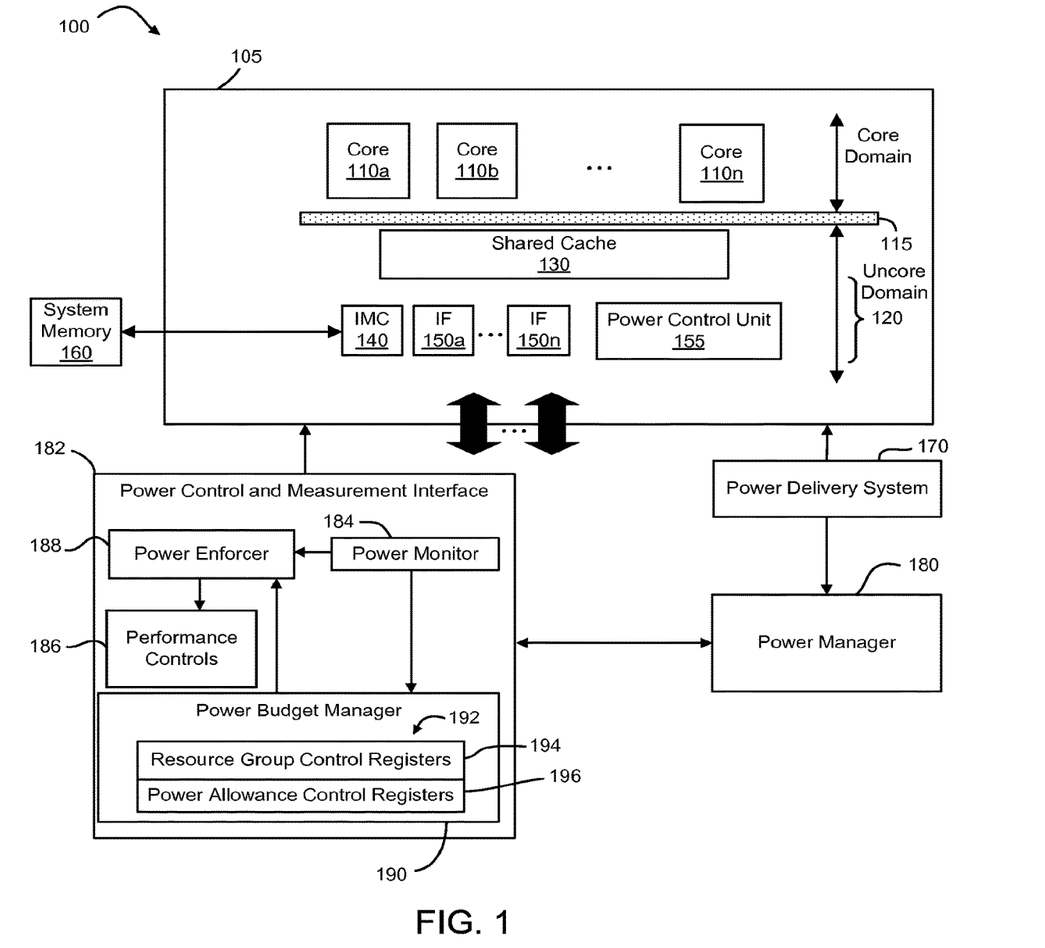
FIG. 1 is a block diagram of a system according to certain embodiments.

FIG. 1 is a block diagram of a system 100 according to certain embodiments. As shown in FIG. 1, the system 100 includes a processing node 105, which may be a single die processor socket including a plurality of cores 110a-110n of a core domain. In other examples, the processing node 105 may be a server or a computing system component such as a microprocessor, an individual core of a multi-core microprocessor, a memory controller hub (MCH), an input/output controller hub (IOH), a memory device, a network interface, or any other type device having one or more resources or power domains that are capable of being monitored and controlled for power consumption. The term power domain, or simply domain, is used herein to refer to any component or set of components capable of being monitored and controlled for power consumption.

The various cores 110a-110n may be coupled via an interconnect fabric 115 to a system agent or uncore domain 120 that includes various components. As shown, the uncore domain 120 may include a shared cache 130 that may be a last level cache. In addition, the uncore domain 120 may include an integrated memory controller (IMC) 840, various interfaces (IF) 150a-150n, and a power control unit 155. A power delivery system 170 is coupled to the processing node 105 and may include a switching or linear voltage regulator (VR, not shown) capable of supplying a range of voltages to the processing node 105. The processing node 105 may communicate with a system memory 160, e.g., via a memory bus. In addition, by interfaces 150a-150n, connection can be made to various off-package components such as peripheral devices, mass storage and so forth. While shown with this particular implementation in the embodiment of FIG. 1, the scope of the present disclosure is not limited in this regard.

The system 100 further includes a power manager 180 and a power control and measurement interface 182. The illustrated power manager 180 may be a third party element or included in the power delivery system 170, and may be implemented in fixed functionality hardware, microcode, firmware, software, or any combination thereof. In other embodiments, the power manager 180 may be included in or executed by the processing node 105. For example, the processing node 105 may include one or more processing cores configured to implement the power manager 180.

The power control and measurement interface 182 provides a flexible interface between the power manager 180 and the processing node 105. The power control and measurement interface 182 provides for an arbitrary grouping of computing threads and resources in the processing node 105. Thus, the power manager 180 may be exposed to a variety of different power domains or sub-domains in the processing node 105. For example, the power control and measurement interface 182 may selectively group any combination of one or more of the cores 110a-110n with the interconnect fabric 115, shared cache 130, IMC 140, one or more IF 150a-150n, power control unit 155, or any other core or uncore element. Thus, each selectively combined group can be managed as a respective power domain.

Although the power control and measurement interface 182 is shown as a separate device or module, the power control and measurement interface 182 may be part of or executed by the power manager 180 or the processing node 105. The power control and measurement interface 182 may be implemented in fixed functionality hardware, microcode, firmware (e.g., run on the power control unit 155), software, or any combination thereof.

In the example embodiment shown in FIG. 1, the power control and measurement interface 182 includes a power monitor module 184, a performance controls module 186, a power enforcer module 188, and a power budget manager module 190. The power monitor module 184 is configured to measure the power consumption of each selected group of computing threads and resources in the processing node 105, and to provide corresponding power monitoring data to the power enforcer 188, the power budget manager 190, and the power manager 180.

The performance controls module 186 includes controls to adjust the performance and power of each selected group of computing threads and resources in the processing node 105 through, for example, adjusting power, adjusting frequency, throttling bandwidth, and/or other performance parameters.

The power enforcer module 188 configures the performance controls module 186 and adapts the configuration over time to maintain an overall average power over a programmable time window. The power enforcer module 188 comprises a control system that may be implemented with standard controller techniques. The power budget manager module 190 comprises logic that outputs power budgets to the power enforcer module 188. The power budget manager module 190 may provide several different interfaces to the power manager 180 that enable it to either directly specify specific power budgets for each selected group of computing threads and resources in the processing node 105 (e.g., in units proportional to Watts) or to specify budgets indirectly by specifying hints about relative importance or influence of each selected group of computing threads and resources in the processing node 105 (in abstract units) and letting the power budget manager module 190 apply internal heuristics to the hints and map them to specific budgets for the selected group of computing threads and resources in the processing node 105.

In certain embodiments, the power budget manager module 190 includes control registers 192 configured to define resource groups and power allowances for each resource group. The granularity at which power is controlled is adjustable by not forcing a particular mapping of resources on each of the defined groups. Rather, the resources may be dynamically selected. As discussed in detail below, the control registers 192 include resource group control registers 194 configured to define the resource groups, and power allowance control registers 196 configured to define a power allowance or limit for each resource group.

Example embodiments discussed below are directed to a single die central processing unit (CPU) socket including multiple cores and other integrated components. In certain such embodiments, only one instance of the control registers is implemented on each CPU socket, and the values stored in the control registers affect the behavior of all managed resources within the CPU socket. Those skilled in the art will recognize from this disclosure, however, that the embodiments shown in the CPU socket embodiments may be applied to many different types of computing devices that comprise a plurality of resources that may be selectively combined and managed.

Figure 2:
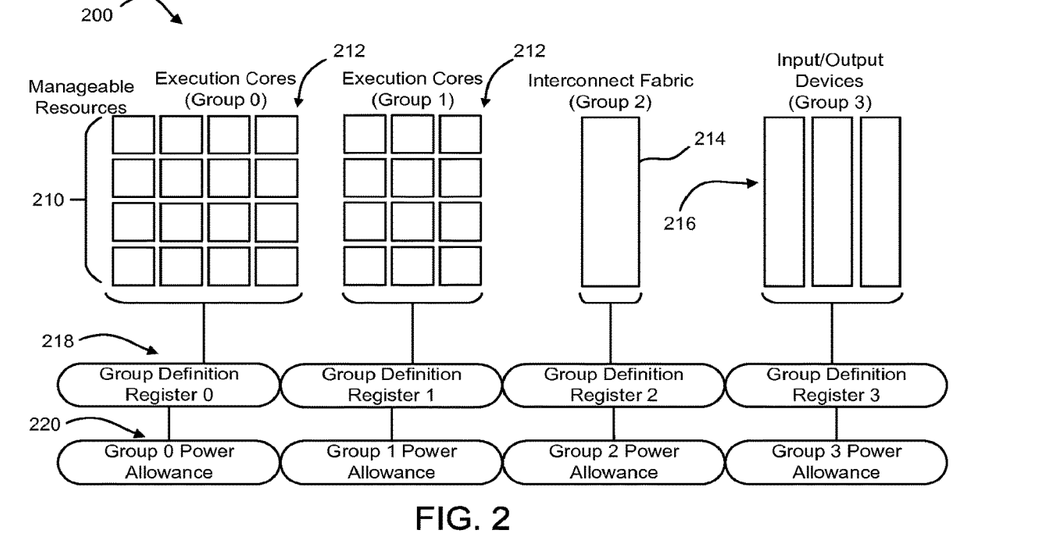
FIG. 2 is a block diagram of a CPU socket according to an example embodiment.

FIG. 2 is a block diagram of a CPU socket 200 according to an example embodiment. The CPU socket 200 includes a plurality of manageable resources 210. In this example, the plurality of manageable resources 210 includes a plurality of execution cores 212, an interconnect fabric 214, and a plurality of input/output devices 216. The CPU socket 200 further includes four resource group control registers 218 and four power allowance control registers 220. In other embodiments, any number of resource group control registers 218 and power allowance control registers 220 may be used, based on a maximum number of groups to define and/or a maximum number of manageable resources 210 to include within defined groups.

System software or an agent (e.g., the power manager 180, power budget manager 192, and/or the power control unit 155) may write values to the resource group control registers 218 to define an arbitrary number of groups of hardware resources to be managed, up to a maximum number of groups determined by the total number of resource group control registers 218 and the addressing space used. The greater the number of groups defined, the more fine-grained the power control granularity on the CPU socket 200. However, a tradeoff may exist wherein a greater number of groups defined by the resource group control registers 218 may result in a higher implementation complexity and cost.

In the example shown in FIG. 2, up to four groups may be defined (Group 0, Group 1, Group 2, and Group 3). During operation, the resource group control registers 218 may define less than four groups. The system software or agent may, for example, dynamically change between defining zero, one, two, three, or four groups. When no groups are defined, the CPU socket 200 may be responsible for determining power allocations among the manageable resources 210 (e.g., as determined by the power control unit 155 shown in FIG. 1). The resource group control registers 218 are shown in FIG. 2 as Group Definition Register 0 configured to define Group 0, Group Definition Register 1 configured to define Group 2, Group Definition Register 2 configured to define Group 2, and Group Definition Register 3 configured to define Group 3.

The resource group control registers 218 may be modified dynamically by system software or another agent at any time during operation to allow for adaptive policies as needed due to changing workload characteristics or application operational behavior, as well as to different system management policies. In the example shown in FIG. 2, the resource group control registers 218 are currently configured to assign a first set of execution cores 212 (sixteen shown) to Group 0, a second set of execution cores 212 to (twelve shown) to Group 1, the interconnect fabric 214 to Group 2, and the plurality of input/output devices 216 (three shown) to Group 3. At any time during operation, different values may be written to the resource group control registers 218 to assign any of the manageable resources 210 to any group in any combination, including combinations of core and uncore resources within the same group.

In one embodiment, each resource group control register 218 is configured to enumerate one or more of the manageable resources 210 that belong to its corresponding group using an unsigned integer resource identification on a design specific addressing space. In such embodiments, each of the manageable resources 210 to be controlled is associated with a unique identification or "address" within the CPU socket 200. The value zero may be reserved to denote no resource (i.e., the particular resource group control register 218 is not currently used to define a group).

The power allowance control registers 220 are each associated with a respective group and are shown in FIG. 2 as a Group 0 Power Allowance register, a Group 1 Power Allowance register, a Group 2 Power Allowance register, and a Group 3 Power Allowance register. During operation, the system software or other agent may write values to each of the power allowance control registers 220 to specify a selected power allowance or limit for its respective group. In certain embodiments, the CPU socket 200 is configured to distribute power evenly among the manageable resources 210 assigned to each group. In other embodiments, the CPU socket 200 may be configured to selectively allocate the power among the manageable resources 210 in each group, as long as the total power consumed by the manageable resources 210 does not exceed the power allowance or limit indicated by the power allowance control register 220 corresponding to the group.

Figure 3:
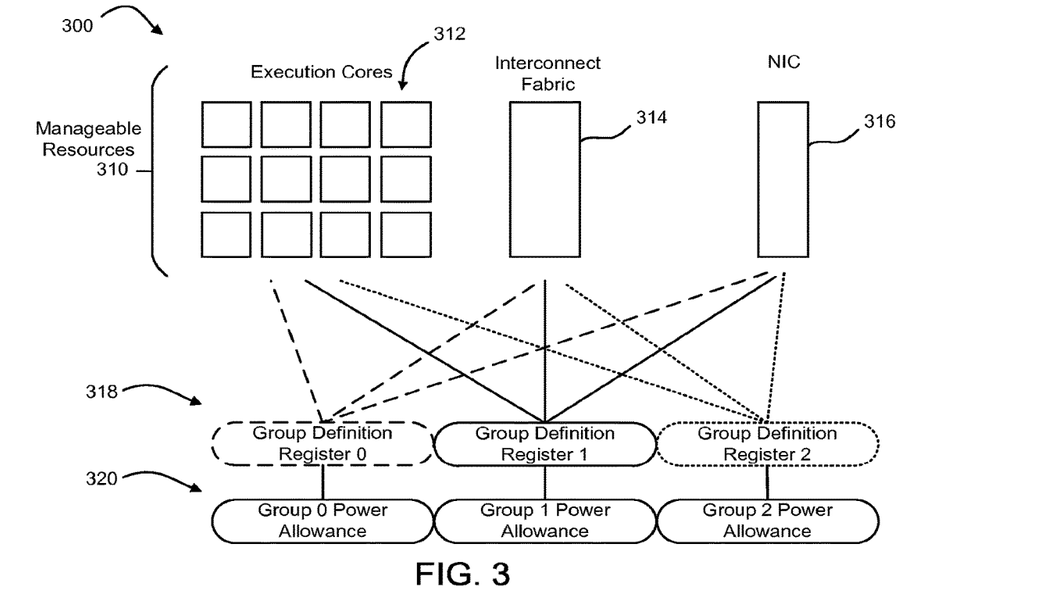
FIG. 3 is a block diagram of a CPU socket according to another example embodiment.

FIG. 3 is a block diagram of a CPU socket 300 according to another example embodiment. The CPU socket 300 includes a plurality of manageable resources 310. In this example, the plurality of manageable resources 310 includes a plurality of execution cores 312, an interconnect fabric 314, and an integrated network interface controller (NIC) 316. Each of the execution cores 312 may support multiple execution threads. Each of the manageable resources 310 is configured to be managed (e.g., exposed to measurement and control) from a power and/or performance point of view. The CPU socket 300 further includes three resource group control registers 318 and three power allowance control registers 320. The embodiment shown in FIG. 3 is provided to show a simplified example of how an addressing space may be used with the resource group control registers 318 and the power allowance control registers 320 to provide a hardware/software interface. However, those skilled in the art will recognize that the example shown in FIG. 3 may be scaled for any number of manageable resources 210, resource group control registers 318, and power allowance control registers 320.

In the example shown in FIG. 3, up to three groups may be defined (Group 0, Group 1, and Group 2). Unlike the example shown in FIG. 2, the example shown in FIG. 3 does not show any particular grouping of resources. Rather, the solid and dashed lines from the resource group control registers 318 represent the ability to assign any of the manageable resources 310 to any of the groups. During operation, the resource group control registers 318 may define less than three groups. The resource group control registers 318 are shown in FIG. 3 as Group Definition Register 0 configured to define Group 0, Group Definition Register 1 configured to define Group 2, and Group Definition Register 2 configured to define Group 2. The power allowance control registers 320 are each associated with a respective group and are shown in FIG. 3 as a Group 0 Power Allowance register, a Group 1 Power Allowance register, and a Group 2 Power Allowance register.

In the example shown in FIG. 3, the manageable resources 310 comprise fourteen resources including twelve execution cores 312, the interconnect fabric 314 across the execution cores 312, and the NIC 316. The example also uses a 4-bit addressing space to identify up to three groups of resources (Group 0, Group 1, and Group 2). The groups can be assigned any of the manageable resources 310 in the CPU socket 300 in any combination. In this example, each of the resource group control registers 318 comprises a 64-bit register to allow enumeration of all possible combinations of the manageable resources 310 within each group. Thus, if RESOURCE_GROUP_G identifies a register corresponding to a particular group (where G=0, 1, or 2 in this example), and ResourceID$_R$ identifies a particular resource (where R=0 to 15 corresponding to the 4-bit address space in this example), then the resource group control registers 318 in this example may be defined as follows:

RESOURCE_GROUP_0[3:0]: ResourceID$_0$ . . . .
RESOURCE_GROUP_0[63:60]: ResourceID$_{15}$
RESOURCE_GROUP_1[3:0]: ResourceID$_0$ . . . .
RESOURCE_GROUP_1[63:60]: ResourceID$_{15}$
RESOURCE_GROUP_2[3:0]: ResourceID$_0$ . . . .
RESOURCE_GROUP_2[63:60]: ResourceID$_{15}$.

By way of example, it is assumed that the system software or other agent defines the relative power allowance for execution cores 1, 2, and 12 in Group 0 versus the power allowance for execution cores 3 to 11 in Group 1, and the communication sub-systems (i.e., the fabric interconnect 314 and the NIC 316) in Group 2. In this example, the execution cores 312 are respectively assigned identifiers 1 to 12 in the address space, the interconnect fabric 314 is assigned identifier 14 and the NIC 316 is assigned identifier 15. To express the selected groups, the system software or other agent writes to the resource group control registers 318 as follows (where, in the identified register, [3:0] indicates bits 0 to three, [7:4] indicates bits 4 to 7, [11:8] indicates bits 8 to 11, and so forth):

RESOURCE_GROUP_0[3:0]=1; [7:4]=2; [11:8]=12
RESOURCE_GROUP_0[63:12]=0
RESOURCE_GROUP_1[3:0]=3; [7:4]=4; [11:8]=5
RESOURCE_GROUP_1[15:12]=6; [19:16]=7; [23:20]=8
RESOURCE_GROUP_1[24:21]=9; [28:25]=10; [32:29]=11
RESOURCE_GROUP_1[63:33]=0
RESOURCE_GROUP_2[3:0]=14; [7:4]=15
RESOURCE_GROUP_2[63:8]=0.

The power allowance for each of the groups is defined by the power allowance control registers 320, as described below. In this example, power is assumed to be evenly distributed across resources within a given defined group by the underlying hardware implementation. As discussed above, however, other embodiments may allow the CPU socket 300 to selectively distribute the allocated power across the resources in each group.

Continuing with the example shown in FIG. 3, the system software or another agent may write values to the power allowance control registers 320 to specify a selected power allowance for a particular resource group. The power allowance in this example is defined as a unit-less 8-bit encoded natural value ranging from 0 to 255. A zero value written to a power allowance control register 320 may be used to express no power limit for a particular resource group. In such embodiments, a zero value indicates that the hardware (e.g., the CPU socket 300) is responsible for deciding on the power for the particular group without instructions from the system software or other agent.

A non-zero value written to a power allowance control register 320 may be used by the CPU socket 300, in certain embodiments, as a relative power bias indication as compared to other non-zero power bias indications. In other words, assume that $S_p(t)$ denotes the total socket power allowance at a given time t and that PA(g) denotes an 8-bit quantity expressed on power allowance control register 320 for a group g; the requested power allowance for a group g at a given moment t may be expressed as $$P(g, t) = Sp(t) \times \frac{PA(g)}{\sum_{i=0}^{N-1} PA(i)},$$

where N represents the total number of resource groups defined.

Following the same example shown in FIG. 3 of a twelve core socket with three groups, the system software or other agent may define the following allowance values to request devoting 20% of the CPU socket's power limit to cores 1, 2 and 12 in Group 0; 50% of the CPU socket's power limit to the remaining cores in Group 1, and 30% of the CPU socket's power limit to the communication sub-systems (i.e., the fabric interconnect 314 and the NIC 316) in Group 2. Thus, if the power allowance control register 320 comprises a single 64-bit register identified as POWER_ALLOWANCE wherein bits 0-7 correspond to Group 0, bits 8-15 correspond to Group 1, and bits 16-23 correspond to Group 2, then data may be written to the power allowance control register 320 as follows:

POWER_ALLOWANCE[7:0]=20; [15:8]=50; [23:16]=30

POWER_ALLOWANCE[63:24]=0.

In certain embodiments, the value written to each power allowance control register, or (in the example above) in defined portions of a single power allowance control register, does not indicate a specific power value (e.g., in Watts) corresponding to a specific group of resources. Rather, as illustrated in the example above, the value (e.g., an unsigned integer) may serve as an abstract "universal coin" to manage power across resources using the software layer. Increasing a power allowance in one resource group by a value "P" and decreasing a power allowance in another resource group by the value "P" is power neutral within a node (e.g., the CPU cores 200, 300 in the above examples), at least from the perspective of a power manager's ability to accurately measure and control the node's power. Increasing the power allowance for a particular resource group may translate into increased performance for the particular resource group (and possibly the node), and may be selected so as to not limit the node's performance when other relevant parameters are unchanged.

In certain embodiments, using a "universal coin" as an abstract yet consistent management unit removes the need for software to understand the mapping of an implementation unit to actual power distribution within the node, which may enable smaller guard bands. Using a "universal coin" may also remove the need for software to understand what is being adjusted within the node (e.g., change in voltage and/or frequency, change in link width, etc.). Thus, no unit equivalence (e.g., Watts, Volts, Hertz, etc.) is implied or required across different products implementing the interface.

In certain embodiments, the hierarchical nature of the interface enables cooperative control systems. For example, a first control system may set a power budget comprising a total power limit across all of the groups, and a second control system may rebalance the power budget between the resource groups without the need to know the total power limit.

In certain embodiments, the encoding for group's power allowance provides an interface that is unit-less and self-adapting to the number of resource groups supported by a particular implementation. Further, the total number of bits used to describe the power allowances naturally increases with the number of supported groups, which avoids encoding accuracy problems when a large number of groups is defined.

The encoding cost in bits for systems with a large number of resources to be controlled may grow considerably when combined with the support for a large number of groups. For example, assuming that Q represents the maximum number of resources to be managed, G represents the number of groups supported, and M represents the maximum number of resources that can be enumerated on each group, the total storage cost per node for both power allowance and resource group registers is $(8 \times G) + \log_2(Q+1) \times M \times G$ bits.

Other embodiments may use other schemes to encode a group's power allowance. For example, a degenerated case may be considered for the scenario in which a large number of resources needs to be managed while only two groups are used. For such an embodiment, a more efficient encoding may be used by defining which group each resource belongs to with a single bit and using the position in the control register as an implicit resource identifier. For example, a single resource group control register may be used to combine cores 0 and 1 into a first group and cores 2 to 63 into a second group, in a 64-core hypothetical system such that:

RESOURCE_GROUP[63:0]=0x3

Thus, using such encoding may reduce the overall cost for G=2 groups to $(8 \times G) + Q$ total bits.

Certain embodiments provide a hardware-software synergy for power budget management. For example, the interface disclosed herein allows an arbitrary number of resource groups to be defined and also provides the flexibility to define power allowance hints to only some or all the defined groups. When no groups are defined or the allowance for a group is not specified the, hardware (e.g., the node) is responsible for making power budgeting decisions for such resources.

Thus, a product implementing the disclosed interface may run "out of the box" without any specific interface-compliant software stack. When compatible software is present, the underlying hardware design uses the provided information to refine its default power budgeting decisions. The disclosed interface does not depend on the specific hardware power budgeting algorithm and may be used in conjunction with traditional feedback loop control mechanisms, including low-pass filters, proportional-integral-derivative (PID) controllers, etc.

Accordingly, certain embodiments provide an opt-in design approach wherein if a particular software stack is designed to manage Q resources over G groups, the same software stack may be used on different (potentially newer) hardware supporting more resources and/or groups, as long as the resource addressing is kept consistent across such designs. Unused groups may have no impact and resources not known to the software may be controlled automatically by hardware.

Given that multiple control registers are used to describe an overall set of software requests, certain embodiments provide atomicity to prevent exposing the hardware to partial and possibly inconsistent definitions of groups and allowances. When changing allowance values, for example, if a single control register suffices for the allowance definition (e.g., eight or less groups supported), a single atomic control register write may be adequate. If two or more independent control register writes are used to define the group allowances, certain embodiments clear out the group definition registers prior to changing the allowance values, and then restore group information once completed. In certain such embodiments, partial power allowance information has no effect in the system when no groups are defined.

As another example embodiment providing atomicity, when changing group definitions, if a single control register suffices to describe a node's groups, a single atomic control register write may be adequate. If two or more independent control register writes are used to define the groups, certain embodiments clear out the group allowance register(s) prior to changing the group definitions. In certain such embodiments, partial group definition information has no effect in the system when no allowances are defined.

Figure 4:
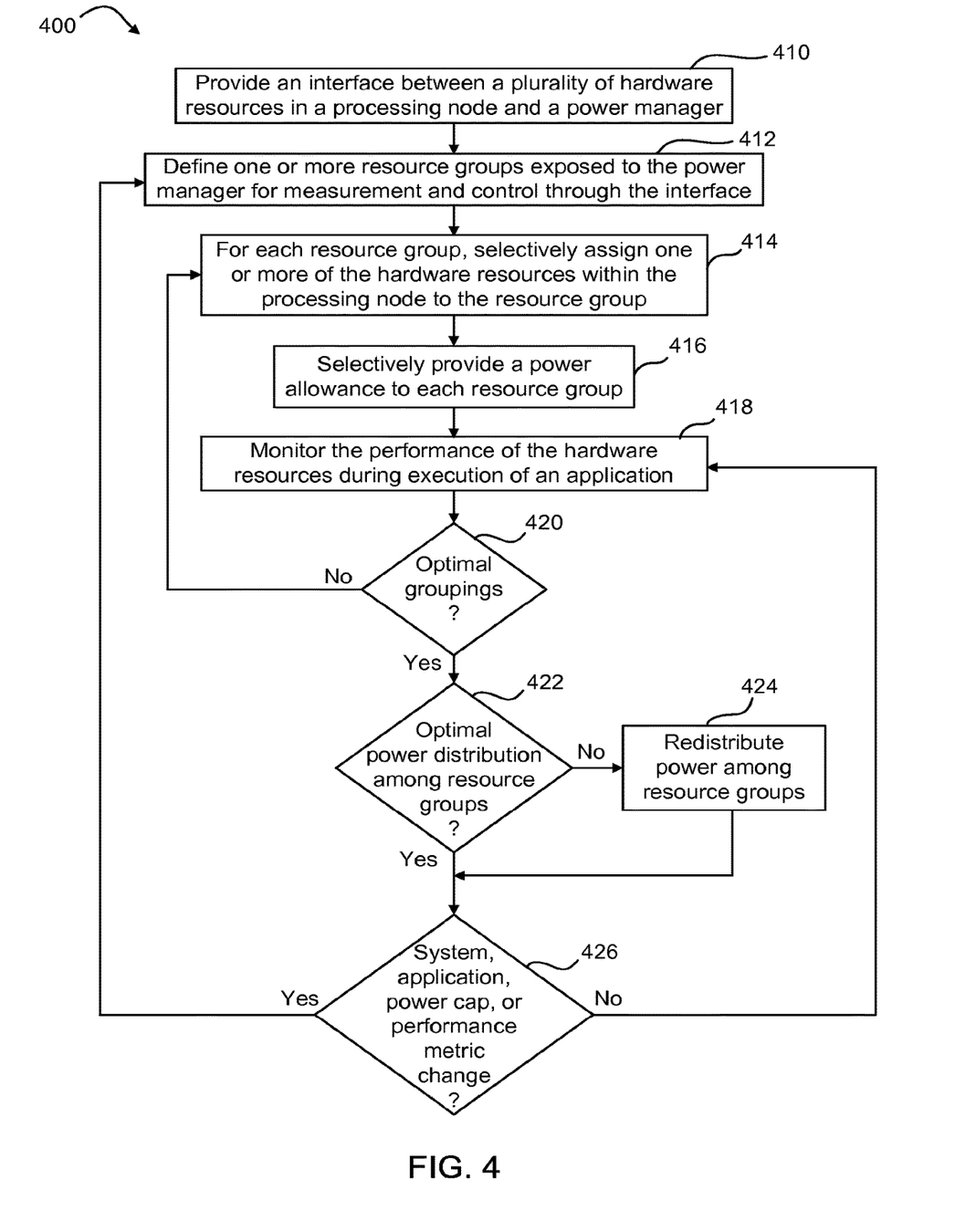
FIG. 4 is a flow chart of a method for managing power in a node according to one embodiment.

FIG. 4 is a flow chart of a method 400 for managing power in a node according to one embodiment. The node may comprise, for example, a server or a computing system component such as a microprocessor, an individual core of a multi-core microprocessor, a memory controller hub (MCH), an input/output controller hub (IOH), a memory device, a network interface, the processing node 105 shown in FIG. 1, the CPU sockets 200, 300 shown in FIGS. 2 and 3, or any other type of device having a plurality of hardware resources that are capable of being monitored and controlled for power consumption.

The method 400 includes providing 410 an interface between a plurality of hardware resources in a processing node and a power manager, and defining 412 one or more resource groups exposed to the power manager for measurement and control through the interface. For each resource group, the method 400 further includes selectively assigning 414 one or more of the hardware resources within the processing node to the resource group. The method 400 further includes selectively providing 416 a power allowance for each resource group.

In certain embodiments, the method 400 also includes monitoring 418 the performance of the plurality of hardware resources during execution of an application by the node. A variety of different definitions of performance may be used, and performance may be measured at a variety of different granularities. Thus, performance can be defined through a metric such as rate of instructions retired, floating-point operations per second (FLOPS), rate of progress, or runtime. Such rates, runtimes, or other performance metrics can be computed at various granularities. For example, the selected performance metric may be measured at short time intervals, measured upon an event such as the end of an iteration (for iterative applications), etc.

The method 400 may further include querying 420 whether an optimal grouping of the plurality of hardware resources has been achieved. For example, the monitoring may indicate that processing cores in a first group may improve performance if reassigned to a second group with a higher power limit. If the optimal grouping has not been achieved, or if it can be improved, the method 400 may return to selectively assigning 414, for each resource group, one or more of the hardware resources within the processing node to the resource group. If, based on current operations, the optimal grouping has been achieved, then the method 400 also queries 422 whether an optimal power distribution among the resource groups has been achieved. If measurements provided through the interface determine that the optimal power distribution has not been reached (or can be further improved), then the method 400 includes redistributing 424 power among the resource groups (e.g., using the "universal coin" to indicate a percentage of a total power limit assigned to each group).

The method 400 also includes querying 426 whether there is a system change, application change, power cap change, or selected performance metric change. If not, the method 400 continues monitoring 418 the performance of the hardware resources. If, on the other hand, there is a determined system change, application change, power cap change, or selected performance metric change, the method 400 repeats by again defining 410 one or more resource groups exposed to the power manager for measurement and control through the interface, selectively assigning 414 hardware resources to the resource groups, and selectively providing 416 a power allowance to each resource group.

Example Embodiments

The following are examples of further embodiments. Examples may include subject matter such as a method, means for perming acts of the method, at least one machine-readable medium including instructions that, when performed by a machine cause the machine to perform acts of the method, or of an apparatus or system for rendering augmented video according to the embodiments and examples described herein.

Example 1 is an apparatus including a node comprising a plurality of hardware resources, and an interface between the plurality of hardware resources of the node and a power manager. The interface comprises logic, at least a portion of which includes hardware. The logic is configured to define one or more resource groups to expose to the power manager for power measurement and control, assign the plurality of hardware resources to the one or more resource groups; and provide a power allowance to each resource group.

Example 2 includes the subject matter of Example 1, wherein the plurality of hardware resources comprise a plurality of processing cores and at least one non-core resource.

Example 3 includes the subject matter of any of Examples 1-2, wherein the at least one non-core resource comprises one or more resource comprising an interconnect fabric, an input/output device, a memory device, and an integrated network interrupt controller (NIC).

Example 4 includes the subject matter of any of Examples 1-3, wherein the interface comprises a plurality of resource group control registers, and wherein to define the one or more resource groups the interface is configured to store resource identification values in one or more of the resource group control registers configured to be exposed to the power manager.

Example 5 includes the subject matter of Example 4, wherein the interface is further configured to store a null or zero value in one or more of the resource group control registers to remove a resource group from exposure to the power manager.

Example 6 includes the subject matter of Example 4, wherein each of the plurality of hardware resources is uniquely associated in the node with one of the resource identification values, and wherein the interface is configured to store each resource identification value within one of the resource group control registers corresponding to a selected resource group to which an associated hardware resource is assigned.

Example 7 includes the subject matter of any of Examples 1-6, wherein the interface comprises one or more power allowance control register, and wherein the interface is configured to store a power allowance value in the one or more power allowance control register for each of the one or more resource groups.

Example 8 includes the subject matter of Example 7, wherein the power allowance value comprises a total power limit for the corresponding resource group.

Example 9 includes the subject matter of Example 7, wherein the power allowance value comprises a power bias indication of a total power for the node distributed across the one or more resource groups.

Example 10 includes the subject matter of Example 9, wherein the power bias indication specifies a percentage of the total power allocated to each of the one or more resource groups.

Example 11 is a method including providing an interface between a plurality of hardware resources in a processing node and a power manager, and defining one or more resource groups to expose to the power manager for measurement and control through the interface. For each resource group, the method includes selectively assigning one or more of the hardware resources within the processing node to the resource group. The method also includes selectively providing a power allowance for each resource group.

Example 12 includes the subject matter of Example 11, wherein defining the one or more resource groups comprises writing resource identification values in one or more resource group control registers exposed to the power manager.

Example 13 includes the subject matter of Example 12, wherein the method further comprises writing a null or zero value in one or more of the resource group control registers to remove a resource group from exposure to the power manager.

Example 14 includes the subject matter of Example 12, wherein each of the plurality of hardware resources is uniquely associated in the processing node with one of the resource identification values, and wherein the method further comprises writing each resource identification value within one of the resource group control registers corresponding to a selected resource group to which an associated hardware resource is assigned.

Example 15 includes the subject matter of any of Examples 11-14, further comprising writing a power allowance value in one or more power allowance control register for each of the one or more resource groups.

Example 16 includes the subject matter of Example 15, further comprising determining the power allowance value as universal coin wherein increasing a first portion of a total power limit for the processing node allocated to a first resource group proportionately decreases a second portion of the total power limit allocated to a second resource group.

Example 17 includes the subject matter of any of Examples 11-16, wherein the method further includes monitoring a performance of the one or more resource groups during an execution of a software application by the processing node, and based on the performance, reassigning at least one of the plurality of hardware resources from a first resource group to a second resource group.

Example 18 includes the subject matter of any of Examples 11-16, wherein the method further includes monitoring a performance of the one or more resource groups during an execution of a software application by the processing node, and based on the performance, redistributing a power limit for the processing node among the one or more resource groups.

Example 19 is at least one computer-readable storage medium having stored thereon instructions that, when executed by one or more processors, cause the one or more processors to perform operations comprising: defining one or more resource groups for measurement and control of a plurality of hardware resources in a processing node through an interface; for each resource group, selectively assigning one or more of the hardware resources within the processing node to the resource group; and selectively providing a power allowance for each resource group.

Example 20 includes the subject matter of Example 19, wherein defining the one or more resource groups comprises writing resource identification values in one or more resource group control registers.

Example 21 includes the subject matter of Example 20, wherein each of the plurality of hardware resources is uniquely associated in the processing node with one of the resource identification values, and wherein the operations further comprise writing each resource identification value within one of the resource group control registers corresponding to a selected resource group to which an associated hardware resource is assigned.

Example 22 includes the subject matter of any of Examples 19-21, wherein the operations further comprise writing a power allowance value in one or more power allowance control register for each of the one or more resource groups.

Example 23 includes the subject matter of Example 22, wherein the operations further comprise determining the power allowance value as universal coin wherein increasing a first portion of a total power limit for the processing node allocated to a first resource group proportionately decreases a second portion of the total power limit allocated to a second resource group.

Example 24 includes the subject matter of any of Examples 19-23, wherein the operations further comprise: monitoring a performance of the one or more resource groups during an execution of a software application by the processing node; and based on the performance, reassigning at least one of the plurality of hardware resources from a first resource group to a second resource group.

Example 25 includes the subject matter of any of Examples 19-23, wherein the operations further comprise: monitoring a performance of the one or more resource groups during an execution of a software application by the processing node; and based on the performance, redistributing a power limit for the processing node among the one or more resource groups.

Example 26 is a method including defining one or more resource groups to expose to a power manager for power measurement and control, assigning a plurality of hardware resources to the one or more resource groups, and providing a power allowance to each resource group.

Example 27 includes the subject matter of Example 26, wherein the plurality of hardware resources comprise a plurality of processing cores and at least one non-core resource in a node.

Example 28 includes the subject matter of any of Examples 26-27, wherein the at least one non-core resource comprises one or more resource comprising an interconnect fabric, an input/output device, a memory device, and an integrated network interrupt controller (NIC).

Example 29 includes the subject matter of any of Examples 26-28, wherein defining the one or more resource groups comprises storing resource identification values in one or more resource group control registers configured to be exposed to the power manager.

Example 30 includes the subject matter of Example 29, wherein the method further comprises storing a null or zero value in one or more of the resource group control registers to remove a resource group from exposure to the power manager.

Example 31 includes the subject matter of Example 29, wherein each of the plurality of hardware resources is uniquely associated with one of the resource identification values, the method further comprising storing each resource identification value within one of the resource group control registers corresponding to a selected resource group to which an associated hardware resource is assigned.

Example 32 includes the subject matter of any of Examples 26-31, wherein the method further comprises storing a power allowance value in one or more power allowance control register for each of the one or more resource groups.

Example 33 includes the subject matter of Example 32, wherein the power allowance value comprises a total power limit for the corresponding resource group.

Example 34 includes the subject matter of Example 32, wherein the power allowance value comprises a power bias indication of a total power for the node distributed across the one or more resource groups.

Example 35 includes the subject matter of Example 34, wherein the power bias indication specifies a percentage of the total power allocated to each of the one or more resource groups.

Example 36 is an apparatus comprising means to perform a method as in any of Examples 11-18 or 26-35.

Example 37 is a machine readable storage including machine-readable instructions to implement a method as in any of Examples 11-18 or 26-35.

The above description provides numerous specific details for a thorough understanding of the embodiments described herein. However, those of skill in the art will recognize that one or more of the specific details may be omitted, or other methods, components, or materials may be used. In some cases, well-known features, structures, or operations are not shown or described in detail.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Various embodiments may be implemented using hardware elements, software elements, and/or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. The scope of the present invention should, therefore, be determined only by the following claims.

The invention claimed is:

1. An apparatus comprising:
an interface to communicate with a plurality of hardware resources on different power domains and a power manager;
logic in communication with the interface, the logic to:
define one or more resource groups to expose to the power manager for power measurement and control;
assign the plurality of hardware resources to the one or more resource groups, wherein at least one resource group comprises a first hardware resource on a first power domain and a second hardware resource on a second power domain forming a relative power domain;
provide a power allowance to each resource group, wherein the power allowance for a resource group associated with the relative power domain controls both the first hardware resource on the first power domain and the second hardware resource on the second power domain; and
selectively and dynamically reassign, during operation, the plurality of hardware resources to the one or more resource groups, by manipulating a plurality of resource group control registers to store resource identification values uniquely associated with each of the plurality of hardware resources within one of the plurality of resource group control registers corresponding to an assigned resource group.

2. The apparatus of claim 1, wherein the plurality of hardware resources comprises a plurality of processing cores and at least one non-core resource.

3. The apparatus of claim 2, wherein the at least one non-core resource comprises one or more resource comprising an interconnect fabric, an input/output device, a memory device, and an integrated network interrupt controller (NIC).

4. The apparatus of claim 1, further comprising the plurality of resource group control registers, and wherein to define the one or more resource groups the logic is configured to store resource identification values in the plurality of resource group control registers configured to be exposed to the power manager.

5. The apparatus of claim 4, wherein the logic is further configured to store a null or zero value in the plurality of resource group control registers to remove a resource group from exposure to the power manager.

6. The apparatus of claim 4, wherein each of the plurality of hardware resources is uniquely associated with one of the resource identification values, and wherein the logic is configured to store each resource identification value within one of a resource group control registers of the plurality corresponding to a selected resource group to which an associated hardware resource is assigned.

7. The apparatus of claim 1, further comprising one or more power allowance control register, and wherein the logic is configured to store a power allowance value in the one or more power allowance control register for each of the one or more resource groups.

8. The apparatus of claim 7, wherein the power allowance value comprises a total power limit for a corresponding resource group.

9. The apparatus of claim 7, wherein the power allowance value comprises a power bias indication of a total power for a node distributed across the one or more resource groups.

10. The apparatus of claim 9, wherein the power bias indication specifies a percentage of the total power allocated to each of the one or more resource groups.

11. A method comprising:
defining one or more resource groups to expose to a power manager for power measurement and control;
assigning one or more hardware resources to the one or more resource groups, wherein at least one resource group comprises a first hardware resource on a first power domain and a second hardware resource on a second power domain forming a relative power domain;
providing a power allowance to each resource group, wherein the power allowance for a resource group associated with the relative power domain controls both the first hardware resource on the first power domain and the second hardware resource on the second power domain; and
selectively and dynamically reassigning, during operation, the one or more hardware resources to the one or more resource groups, by manipulating a plurality of resource group control registers to store resource identification values uniquely associated with each of the one or more hardware resources within one of the plurality of resource group control registers corresponding to an assigned resource group.

12. The method of claim 11, wherein defining the one or more resource groups comprises writing resource identification values in one or more resource group control registers exposed to the power manager.

13. The method of claim 12, further comprising writing a null or zero value in the one or more of resource group control registers to remove a resource group from exposure to the power manager.

14. The method of claim 12, wherein each of the one or more hardware resources is uniquely associated in a processing node with one of the resource identification values, and wherein the method further comprises writing each resource identification value within one of the resource group control registers corresponding to a selected resource group to which an associated hardware resource is assigned.

15. The method of claim 11, further comprising writing a power allowance value in one or more power allowance control register for each of the one or more resource groups.

16. An apparatus comprising:
an interface to communicate with a plurality of hardware resources;
a plurality registers including group control registers and power allowance control registers; and
logic in communication with the interface, the group control registers, and the power allowance control registers, the logic to:
write resource group values to one or more of the group control registers to define one or more resource groups, wherein each resource group clusters hardware resources based on a current operating behavior;
write power budget values to the power allowance control registers to define a power distribution among the one or more resource groups; and
selectively and dynamically reassign, during operation, one of the plurality of hardware resources from a first resource group to a second resource group to improve performance, by manipulating the group control registers to store resource identification values uniquely associated with each of the plurality of hardware resources within one of the resource group control registers corresponding to an assigned resource group.

17. The apparatus of claim 16, wherein the plurality of hardware resources comprises a plurality of elements on a first power domain and at least one element on a second power domain.

18. The apparatus of claim 16, wherein each of the plurality of hardware resources is uniquely associated with one of the resource identification values, and wherein the interface is configured to store each resource identification value within one of the resource group control registers corresponding to a selected resource group to which an associated hardware resource is assigned.

19. The apparatus of claim 16, wherein the power allowance value comprises a total power limit for the corresponding resource group.

20. The apparatus of claim 16, wherein the power allowance value comprises a power bias indication of a total power for a node distributed across the one or more resource groups.

* * * * *